Figure 1:
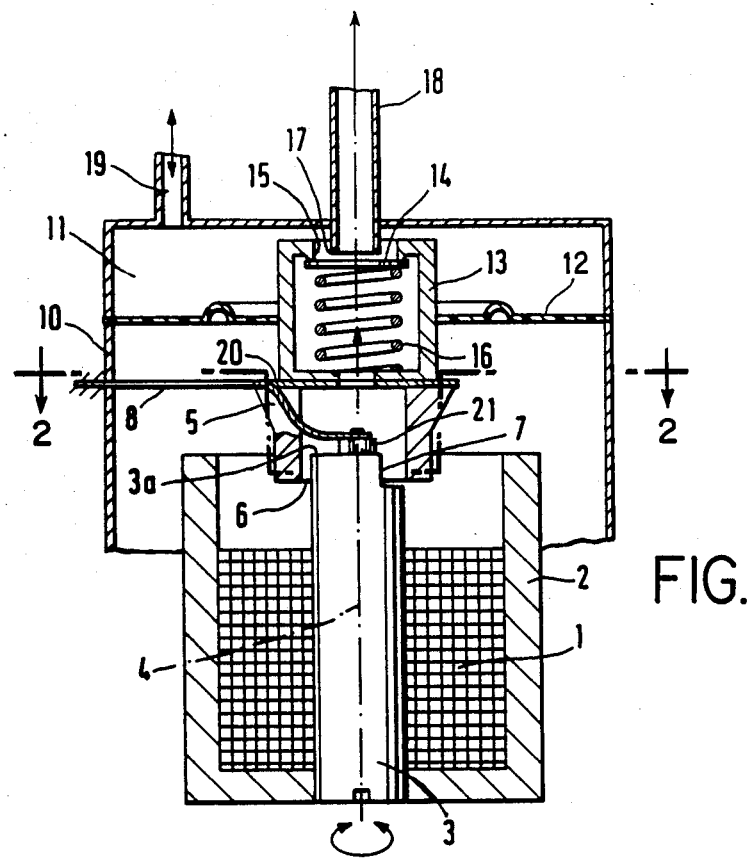

United States Patent [19]

Weitschorke-Muhsold et al.

[11] Patent Number: 4,793,373

[45] Date of Patent: Dec. 27, 1988

[54] CURRENT-PRESSURE TRANSDUCER, PARTICULARLY FOR A VACUUM CONTROL IN AUTOMOTIVE VEHICLES

[75] Inventors: Stephan Weitschorke-Muhsold, Usingen; Wolfgang Göcking, Neu-Anspach, both of Fed. Rep. of Germany

[73] Assignee: VDO Adolf Schindling AG, Frankfurt am Main, Fed. Rep. of Germany

[21] Appl. No.: 836,289

[22] Filed: Mar. 5, 1986

[30] Foreign Application Priority Data

Mar. 9, 1985 [DE] Fed. Rep. of Germany ....... 3508481

[51] Int. Cl.⁴ ............................................. G05D 16/06
[52] U.S. Cl. .............................. 137/116.5; 137/116.6; 137/907; 251/129.08; 251/129.18
[58] Field of Search ............................. 137/116.5, 907; 251/129.08, 129.18

[56] References Cited

U.S. PATENT DOCUMENTS 3,545,472 12/1970 Franz .................................. 137/116.5
4,598,729 7/1986 Naito .................................. 137/116.5

FOREIGN PATENT DOCUMENTS 2109597 9/1972 Fed. Rep. of Germany .

Primary Examiner—Robert G. Nilson
Attorney, Agent, or Firm—Martin A. Farber

[57] ABSTRACT

A current-pressure transducer, in particular for a vacuum control in automotive vehicles, is developed with a chamber (11) which is provided with a connection (18) for supply vacuum, with a connection (19) for removal of control pressure, with an air inlet for outside pressure and with a membrane (12) as chamber wall. The membrane can be displaced by a plunger-type armature (5) of a plunger-type armature electromagnet (1-7). With the membrane there is controlled a double valve (13-17) which, depending on the position of the membrane (12), can produce a fluid-connecting connection to the supply vacuum or to the outside pressure until the control pressure in the chamber (11) corresponds to the force exerted by the plunger-type armature (5) on the membrane and, in particular, is proportional to it. For the end position of the slope of the pressure-current characteristic, an approximately annular air gap (6) between the plunger-type armature (5) and a core (3) of the electromagnet is developed eccentrically to the longitudinal axis of said magnet and is adjustable rotatably around the longitudinal axis. The plunger-type armature (5) is for this purpose swingably mounted around a swing point outside the center line.

7 Claims, 2 Drawing Sheets

CURRENT-PRESSURE TRANSDUCER, PARTICULARLY FOR A VACUUM CONTROL IN AUTOMOTIVE VEHICLES

BACKGROUND OF THE INVENTION

The present invention relates to a current-pressure transducer, particularly for a vacuum control in automotive vehicles, having a vacuum chamber divided by a membrane with a double valve on one side of the membrane activatable by pressure on the membrane, and including a solenoid activatable valve on the opposite side of the membrane and connected to the membrane.

Such current-pressure transducers can be used in exhaust gas return systems and in a turbo-charger control for controlling the bypass valves.

Features of current-pressure transducers of this type are known a vacuum regulator for vacuum systems, in particular for the testing of ignition distributors with double vacuum displacement, in which a single vacuum pump and two such vacuum regulators are used (Federal Republic of Germany OS No. 21 09 597). One chamber of this vacuum regulator is provided with a connection for supply vacuum as well as with a connection to receive an adjustable controlled vacuum. The chamber is closed off on one side by a membrane which is connected, via a spring, to a threaded rod which, in its turn, rests via a knurled nut against an extension of the chamber. Depending on the adjustment of the threaded rod, a greater or lesser force is exerted on the membrane. The position of the membrane depends on this force and on the vacuum prevailing in the chamber as compared with the external pressure (atmospheric pressure). Via a double-armed lever, the membrane acts on a first valve member, which is developed as a ball and rests within the chamber against a conical valve seat, and on a second valve member, also developed as a ball, which is arranged outside the chamber. A compression spring urges the second valve member at all times towards the corresponding valve member. The first valve member is moved by the vacuum in the chamber against its valve seat as far as the deflection of the membrane permits. The second valve member then lifts off from its seat and establishes a connection between the chamber and the outer pressure (atmospheric pressure) when the knurled nut is displaced in the direction towards lesser vacuum in the chamber. The second valve member then closes again when the vacuum in the chamber has reached the predetermined value.

It is, to be sure, conceivable to replace the threaded rod, the spring and the knurled nut of the known pressure regulator by an electromagnet with plunger-type armature in order to control the vacuum in the chamber, and thus the available control pressure, as a function of the current with which the said electromagnet is energized. This, however, still does not provide any teaching as to how a pressure-current characteristic of such a current-pressure transducer can be controlled in such a manner that this characteristic becomes steeper or less steep. One could at most think of replacing the spring between the threaded rod and the membrane, but by this only a stepwise adjustment of the characteristic is possible.

The object of the present invention is therefore to develop a current-pressure transducer of the aforementioned type in such a manner that a pressure-current characteristic of adjustable slope can be obtained. The linearity of the pressure-current characteristic should be affected as little as possible thereby.

This object is achieved by the construction of the current-pressure transducer with an approximately annular air slot (6) between the plunger-type armature (5) and a core (3) of the electromagnet (1) developed eccentrically to the longitudinal axis (4) of said electromagnet and rotatably adjustable around the longitudinal axis, and that the plunger-type armature (5) is mounted swingable around the swing point outside the center line.

The inventive principle includes the fact that the narrowest place in the radial air gap is shifted with respect to the point of swing of the plunger-type armature. The narrowest point in the air gap is at the same time the place where the greatest amount of force is present between the plunger-type armature and the core of the plunger-type armature electromagnet. By the displacement of the narrowest point of the air gap, the point of attack of the resultant total force is thus also changed. Since the point of swing is asymmetric to the center line of the system, there is produced around the axis of swing on the plunger-type armature a greater or lesser moment, which acts on the membrane—preferably via the valve block. The eccentric development of the air ga between the plunger-type armature and the core of the electromagnet presupposes a construction of the plunger-type armature electromagnet which is practically of rotational symmetry around the longitudinal axis.

Thus, by the rotary adjustment of the eccentric air gap the slope of the pressure-current characteristic can be changed, the slope depending on the factor by which a current exciting the plunger-type armature electromagnet causes a prestressing of the membrane at the chamber.

By the rotary adjustment of the air gap the linearity of the characteristic, i.e. the dependence of the resultant control pressure on the exciting current is no impaired.

The precision of the current-pressure transducer is not reduced by the adjustment of the characteristic since no additional frictional hysteresis is produced by the setting means for the radial eccentric air gap. Finally, the means for setting the eccentric air gap can be manufactured and mounted at little expense.

In detail, as will be described hereinafter, a leaf spring is provided for the swingable mounting of the plunger-type armature. The restoring force of such a spring is so slight that the pressure-current characteristic is not falsified thereby. A leaf spring represents a simple means for achieving the hinge-like mounting of the plunger-type armature.

The eccentric shaping of the approximately annular air gap is produced in particularly inexpensive manner according to a further feature of the invention by a corresponding shaping of the substantially cylindrical coil core of the plunger-type armature electromagnet. The coil core is rotatably adjustable, i.e. the coil core can be turned manually in order to adjust the pressure-current characteristic, but it then retains its rotary position upon the operation of the current-pressure transducer.

With an additional pretensioning spring, in accordance with another inventive feature, which spring connects the coil core of the plunger-type armature electromagnet to the plunger-type armature and/or the membrane of the chamber, the zero point of the characteristic can be established or offset a desired amount.

By means of a set screw, tee initial tension of the biasing spring is preferably continuously adjustable, so as to be able to continuously displace the zero point of the pressure-current characteristic.

The double valve, which forms part of the current-pressure transducer, is developed, in accordance with to-yet another inventive feature, with a valve block which is formed essentially as a hollow cylinder and is introduced into the membrane. The valve block, in combination with a valve member which is pressed against a knife-shaped atmospheric valve seat, forms an atmospheric valve between the chamber and the outer pressure. Furthermore, it forms a vacuum valve together with a supply valve seat on the connection for supply vacuum. The valve member which cooperates with this valve block can generally be of disk shape. In such case, the central region of the disk serves for the closing off of the supply valve seat while the outer edge of the disk of the preferably circular disk cooperates with the knife-shaped atmospheric valve seat in the valve block. Proper operation, i.e. the possibility of the complete closing at the same time of the atmospheric valve seat and of the supply valve seat, presupposes, however, that the two valve seats lie in planes which are precisely parallel to each other. This requires a corresponding expense in manufacture, and particularly assembly expense.

However, by the special development of the valve member in accordance with a flattered special shell construction, both the supply valve seat and the—simply developed—atmospheric valve seat can be simultaneously closed tight with the same valve member even if the valve seats do not lie in planes which are precisely parallel to each other. The position of the valve member is determined by the supply valve seat, which is tightly closed by the one of the two flattenings of the valve member, which has the shape of a spherical shell. If, in this situation, the atmospheric valve seat is also to be closed by the valve member, this automatically takes place completely as a result of the curvature of the spherical part of the valve member which cooperates with this valve seat. By the dependable closing of the supply valve seat the consumption of air can be minimized, i.e. in the adjusted condition of the current-pressure transducer a source of vacuum is acted on only corresponding to the removal of control pressure. In this way, special possibilities for use are opened up for the current-pressure transducer in automobile construction, particularly in diesel vehicles with limited vacuum pump power. The second of the two flattenings of the valve member contributes essentially to the dependable alignment of the valve body on the supply valve seat when the current-pressure transducer is placed under swinging load, caused, for instance, by engine vibration. Due to the second flattening, the valve member is developed symmetrically to the central plane which lies parallel to the two flattenings. In this way, the center of gravity and center of moments of the valve member practically coincide and the valve member, which rests on a compression spring, does not assume a Preferred position resulting from the center of gravity.

Figure 2:
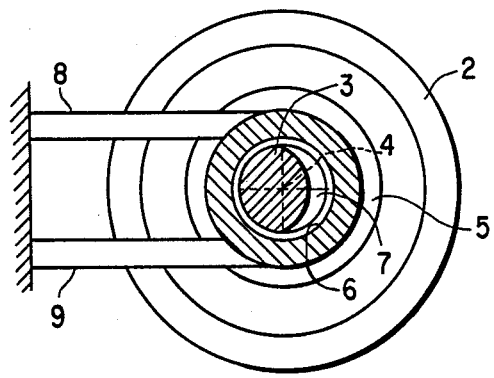
Figure 3:
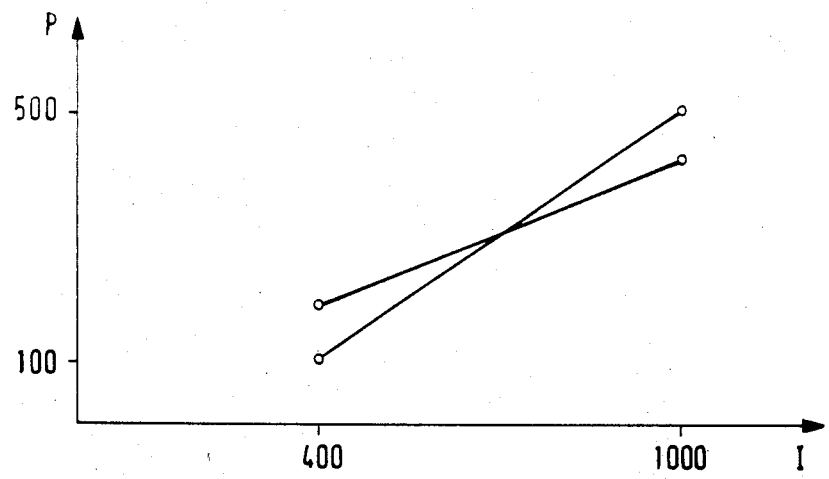
Figure 4:
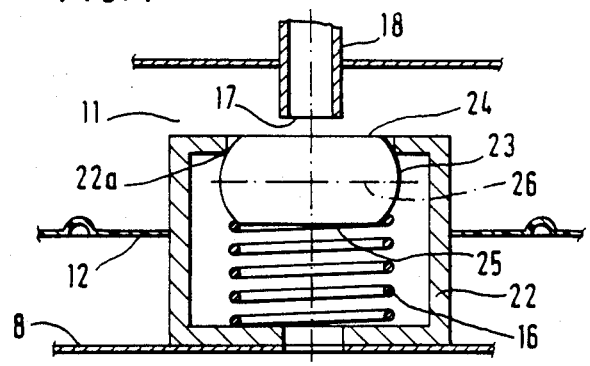

The invention will be explained below with reference to a drawing containing four figures, in which FIG. 1 is a longitudinal section through a pressure-current transducer, FIG. 2 is a cross section through the plunger-armature type electromagnet in the region of the approximately annular eccentric air slot, taken along the dashed line 2—2 in FIG. 1, FIG. 3 shows adjustable pressure-current characteristics, and FIG. 4 shows a detail of a preferred variant of a double valve of the current-pressure transducer in longitudinal section, in particular the valve member.

In FIG. 1, 1 is an electromagnet of a plunger-type armature electromagnet which is arranged in a ferromagnetic pot 2 around a coil core 3. The electromagnet with the ferromagnetic pot and the coil cord is substantially symmetrical to a longitudinal axis 4.

At the open end of the coil pot, 2 in the region of an end 3a of the coil core 3, the latter is surrounded in part by an plunger-type armature 5, which is also of ferromagnetic material. The plunger-type armature 5 is also developed with rotational symmetry to the longitudinal axis 4, and essentially as a hollow cylinder which, however, widens at one part of its outer circumference. With this shape of the plunger-type armature 5, substantial independence of the force exerted by the electromagnet 1 on the plunger-type armature 5 from the path position of the plunger-type armature 5 is to be obtained in the manner that the properties of a normal flat armature and of a cylindrical plunger-type armature are combined. The current-force linearity which is also desired is obtained by the energizing of the electromagnet within a magnetization range in which the magnetic circuit formed by the ferromagnetic pot 2, the plunger-type armature 5 and the coil core 3 is partially saturated.

One special feature of the coil core 3 is a milling 7, eccentric to the longitudinal axis 4, in the region of the end 3a. Furthermore, the coil core can be turned by a tool within the ferromagnetic pot 2. In this way the circumferential position of an air gap 6, which as a result of the eccentric milling 7 of the coil core 3 is also eccentric can be adjusted.

In order that this adjustability of the air gap 6 affects 26 the behavior of the plunger-type armature 5, the latter is provided with leaf springs 8 and 9 mounted on the inside of a housing 10. In this connection, a point of swing (not shown) of the leaf springs 8 and 9 lies in the vicinity of the place where leaf spring 8 and 9 is embedded in the housing 10. The leaf springs thus act as hinges around the corresponding points of swing.

Since the narrowest point of the air gap 6 is determinative for the introduction of force onto the plunger-type armature 5, it is possible, by turning the coil core 3 by means of the eccentric milling 7, to predetermine the place of the strongest introduction of force onto the plunger-type armature 5 with respect to the point of swing. When the place of the strongest introduction of force onto the plunger-type armature 5 is close to the point of swing, a small moment of swing is introduced into the plunger-type armature 5 while in the opposite case, when the place of the strongest introduction of force is furthest from the point of swing, a large moment of swing is introduced. This adjustment of the position of the strongest introduction of force onto the plunger-type armature 5 determines the pressure-current characteristic of FIG. 3, i.e. the slope of this characteristic, in a manner which will be explained below.

The current-pressure transducer includes a valve part having a double valve, which is arranged in a chamber 11. The chamber 11 is substantially closed on one side by a membrane 12 into which a valve block 13 is introduced. The valve block 15 is developed essentially as a hollow cylinder and can be closed by a plate-shaped valve member 14 which is pressed by a compression spring 16 against an atmospheric valve seat 15 having an annular knife edge. The atmospheric valve seat 15 and the valve member 14 form an atmospheric valve. On the other hand, the valve member 14 is at the same time part of a vacuum valve which is formed with a supply valve seat 17 at the end of a connection 18 for supply vacuum. The valve member 14 can be pressed, together with the valve block 13, against the supply valve seat 17 if the membrane 12 yields correspondingly.

The electromagnet 1 acts by means of magnetic force on the plunger-type armature 5 and thus via the valve block 13 on the membrane 12. By means of a biasing spring 20 which counteracts the magnetic force and is fastened, by means of a set screw 21, on the core 3 of the coil, an initial stress is transmitted to the membrane 12, said stress fixing the zero point of the pressure-current characteristics in FIG. 3 (offset). FIG. 1 shows connection of the biasing spring 20 to leaf spring 8, connection of the biasing spring 20 is made by a passage in a side of the armature 5 as shown in FIG. 1.

Depending on the excitation of the electromagnet 1, the latter, via the plunger-type armature 5, exerts a force on the valve block 13 which thus pulls the valve member 14 away from the supply valve seat 17. The atmospheric valve is in this connection closed by the pressing of the valve member 14 against the atmospheric valve seat 15. The control pressure which can by removed from 9 connection 19 thus drops within the chamber 11. At the same time, due to the lower control pressure in the chamber 11, the membrane 12 deforms in the direction opposite the displacement effected by the magnetic force so that the valve block 13, together with the valve member 14, again moves towards the supply valve seat 17 until the vacuum valve is closed when the forces on the membrane 12 are balanced. If, with the vacuum valve closed, i.e. the valve member 14 resting against the supply valve seat 17, the magnetic force decreases then the valve block 13 will be pressed up further. In such case, the valve member 14 will be pressed down from the atmospheric valve seat 14 by the supply valve seat 17 against the force of the compression spring 16. The atmospheric valve therefore opens and the control pressure in the chamber 11 increases again by partial equalization with the outside pressure. This equalization continues until the control pressure corresponds to the magnetic force.

Thus the current-pressure transducer sets the control pressure which is substantially proportional to the current exciting the electromagnet 1 which current, however, is independent of the variations in the supply vacuum. The vacuum valve and the atmospheric valve are opened only long enough to effect the above-described processes. The consumption of supply vacuum power is therefore slight.

Since by the adjustment of the coil core 3 the factor by which the exciting current exerts a moment of swing on the plunger-type armature 5 is changed, the factor with which the magnetic force acts in the final analysis on the membrane is changed in the same way. This resulting a different slope of the pressure-current characteristics, as shown in FIG. 3. By adjustment of the set screw 21 on which the biasing spring 20 acts, the starting point (offset) of the characteristics is established, as described.

FIG. 4 shows a variant of the valve part, in which parts which are also present in the valve part which have been described are provided with corresponding reference numbers. FIG. 4 represents a portion of the chamber 11 of FIG. 1.

The valve part of FIG. 4 includes a valve block 22 which is developed in a manner similar to the valve block 13 of FIG. 1 but, in simplified manner, does not have annular cutting edges; rather an atmospheric valve seat is formed by an edge 22a of a circular opening. Upon comparing the embodiments of FIGS. 1 and 4, it is noted that the valve block 22 (FIG. 4) connects with the spring 8 and the membrane 12 in the same fashion that the valve block 13 (FIG. 1) connects with the spring 8 and the membrane 12. Against this edge there rests a valve member 23 which has essentially the shape of a spherical shell flattened on two sides. The resting against the edge 22a takes place via the shell-shaped part. An upper flattening 24 of the shell-shaped part is suitable for resting against the supply valve seat 17. A lower flattening 25, which is of the same size, lies at the same distance from and parallel to a central plane 26 as the upper flattening 24. The shape of the valve member 23 can counteract an offset of the supply valve seat 17 to the atmospheric valve seat—edge 22a. If the upper flattening 24 rests in tightly closing manner against the supply valve seat 17, then, despite the tilted installation position of the supply valve seat 17, the atmospheric valve seat can also be tightly closed at the edge 22a by the ball-shaped part of the valve member by the force of the spring 16. In other words, the shell-shaped valve member can be swung by the supply valve seat 17 automatically into a position in which both the supply valve seat 17 and the atmospheric valve seat are closed.

The valve member 27 is so balanced by the lower flattening 25 that it does not leave the described position for dependable closing of the supply valve seat 17 and of the atmospheric valve seat under the influence of the swing.

With respect to FIG. 3, in which the pressure-current characteristics are shown, it may furthermore be added that the abscissa represents the current in mA and the ordinate the pressure in hPa.

We claim:

1. A current-pressure transducer, in particular for vacuum control in automotive vehicles, having a chamber including a connection for supply vacuum and a connection for relief of control pressure within the chamber, having an air inlet for outside pressure and a flexible membrane serving as an internal chamber wall, there being a plunger-type armature of a plunger-type armature electromagnet for displacing the membrane, the transducer further comprising a double valve which is controlled by the membrane and, depending on the position of the membrane, establishes a fluid-conducting connection to the supply vacuum or to the outside pressure until the control pressure in the chamber corresponds to the force exerted by the plunger-type armature on the membrane as by a proportional relationship between the control pressure and the force; and wherein the transducer further comprises an approximately annular air gap between the plunger-type armature and a core of the electromagnet, tee gap being developed eccentrically to a longitudinal axis of said electromagnet and being rotatably adjustable around the longitudinal axis; wherein the plunger-type armature is mounted swingable around a swing point spaced apart for a center line of said chamber.

2. A current-pressure transducer according to claim 1, further comprising
at least one leaf-spring to provide the swingable mounting of the plunger-type armature.

3. A current-pressure transducer according to claim 2, further comprising
a biasing spring which operatively connects the core of the plunger-type armature electromagnet to the plunger-type armature.

4. A current-pressure transducer according to claim 1, wherein
said core is a substantially cylindrical coil core of the plunger-type armature electromagnet and is eccentric in the region of an end thereof which faces the plunger-type armature, and wherein
adjustment of the air gap is effected by turning said cylindrical coil core.

5. A current-pressure transducer according to claim 4, further comprising
a biasing spring which operatively connects the coil core of the plunger-type armature electromagnet to the plunger-type armature.

6. A current-pressure transducer according to claim 1, further comprising
a biasing spring which operatively connects the core of the plunger-type armature electromagnet to the plunger-type armature.

7. A current-pressure transducer according to claim 6, further comprising
a set screw, and wherein initial tension of the biasing spring is adjustable by means of the seat screw.

* * * * *